US012108708B2

(12) United States Patent
Goering et al.

(10) Patent No.: US 12,108,708 B2
(45) Date of Patent: Oct. 8, 2024

(54) SPLIT ROLLER CONFIGURATION FOR A ROUND MODULE BUILDER OR ROUND BALER

(71) Applicant: DEERE & COMPANY, Moline, IL (US)

(72) Inventors: Kevin J. Goering, Cambridge, IA (US); Justin E. Hummel, Des Moines, IA (US); Jeffrey S. Wigdahl, Ames, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/399,141

(22) Filed: Aug. 11, 2021

(65) Prior Publication Data

US 2021/0360862 A1    Nov. 25, 2021

Related U.S. Application Data

(62) Division of application No. 15/905,986, filed on Feb. 27, 2018, now Pat. No. 11,109,536.

(Continued)

(51) Int. Cl.
*A01F 15/07* (2006.01)
*A01D 46/08* (2006.01)
(Continued)

(52) U.S. Cl.
CPC .............. *A01F 15/18* (2013.01); *A01D 46/08* (2013.01); *A01D 46/084* (2013.01); *A01F 15/07* (2013.01);
(Continued)

(58) Field of Classification Search
CPC ...... A01F 15/07; A01F 17/0705; A01F 15/18; A01F 15/0833; A01F 2015/186;
(Continued)

(56) References Cited

U.S. PATENT DOCUMENTS 3,837,159 A * 9/1974 Vermeer ................. A01F 15/07
100/88
3,981,391 A 9/1976 Phillips et al.
(Continued)

FOREIGN PATENT DOCUMENTS

CN  102647901 A  8/2012
CN  203040227 U  7/2013
(Continued)

OTHER PUBLICATIONS

Brazilian Office Action issued in Patent Application No. 1020180156543, dated Jun. 14, 2022, in 04 pages.
(Continued)

*Primary Examiner* — Jimmy T Nguyen
(74) *Attorney, Agent, or Firm* — Taft Stettinius & Hollister LLP; Stephen F. Rost

(57) ABSTRACT

A round bale or module building assembly with a frame having a first wall and a second wall separated from one another by a module width and a plurality of rollers positioned between the first wall and the second wall, the plurality of rollers defining at least one belt path. Wherein, at least two rollers of the plurality of rollers have a combined width configured to substantially span the module width.

20 Claims, 13 Drawing Sheets

Related U.S. Application Data

(60) Provisional application No. 62/545,091, filed on Aug. 14, 2017.

(51) Int. Cl.
*A01F 15/08* (2006.01)
*A01F 15/18* (2006.01)
*A01D 43/00* (2006.01)

(52) U.S. Cl.
CPC ........ *A01F 15/0833* (2013.01); *A01D 43/006* (2013.01); *A01F 2015/077* (2013.01); *A01F 2015/186* (2013.01)

(58) Field of Classification Search
CPC . A01F 2015/077; A01D 46/08; A01D 46/084; A01D 43/006
USPC .................................. 100/87, 88, 89; 56/341
See application file for complete search history.

(56) References Cited

U.S. PATENT DOCUMENTS

| | | | | |
|---|---|---|---|---|
| 4,339,907 | A | * | 7/1982 | Kopaska ................ A01F 15/07 100/88 |
| 4,550,557 | A | | 11/1985 | Vissers et al. |
| 5,315,925 | A | | 5/1994 | Viaud et al. |
| 6,094,899 | A | | 8/2000 | Viesselmann |
| 6,170,246 | B1 | * | 1/2001 | Underhill ................ A01F 15/07 56/341 |
| 6,341,470 | B1 | | 1/2002 | Lacey |
| 6,874,412 | B1 | | 4/2005 | Glaszcz et al. |
| 7,640,852 | B1 | * | 1/2010 | Anstey ................ A01F 15/0883 100/88 |
| 7,913,482 | B2 | * | 3/2011 | Olander .............. A01F 15/0833 100/88 |
| 2014/0041537 | A1 | * | 2/2014 | Hubach ................... A01F 15/18 100/88 |
| 2014/0116272 | A1 | | 5/2014 | De Craemer |
| 2015/0075130 | A1 | | 3/2015 | Ryz |
| 2016/0135376 | A1 | * | 5/2016 | Raaijmakers ........... A01F 15/18 56/341 |

FOREIGN PATENT DOCUMENTS

| | | | | | |
|---|---|---|---|---|---|
| EP | | 509425 | A1 | * 10/1992 | ............. A01F 15/07 |
| EP | | 0539549 | B1 | 8/1996 | |
| GB | | 424031 | A | 3/1934 | |

OTHER PUBLICATIONS

Chinese Office Action issued in application No. 201810840853.4 dated Jan. 17, 2022 (08 pages).

* cited by examiner

SPLIT ROLLER CONFIGURATION FOR A ROUND MODULE BUILDER OR ROUND BALER

CROSS-REFERENCE TO RELATED APPLICATIONS

This Application is a divisional of U.S. application Ser. No. 15/905,986 filed Feb. 27, 2018 and titled "SPLIT ROLLER CONFIGURATION FOR A ROUND MODULE BUILDER OR ROUND BALER," and claims the benefit of U.S. Provisional Application No. 62/545,091 filed on Aug. 14, 2017, the disclosures of which are incorporated herein by reference in their entirety.

FIELD OF THE DISCLOSURE

The present disclosure relates to a round module builder or round baler, and in particular, to a round module builder or baler that utilizes a split roller configuration.

BACKGROUND OF THE DISCLOSURE

Round module builders or balers use belts and rollers to manipulate harvested material into a desired form. A round hay baler and a round module builder for cotton both typically use belts under tension running on a series of rollers to compact the harvested material into a cylindrical shape. The belts travel along the rollers to generate a forming chamber wherein the harvested material is collected and formed into the desired shape and density. To facilitate proper module or bale formation, some of the rollers are typically movable to allow the forming chamber to alter size to accommodate more material as it is harvested. The final diameter of the round module or bale is limited by the size of the belts and overall stability of the round module or bale when formed. However, the width of the round module or bale is limited by the stress tolerances of the rollers. As the width of the baler increases, the bending loads on the rollers also increases.

SUMMARY

One embodiment of the present disclosure is a round bale or module building assembly having a frame with a first wall and a second wall separated from one another by a module width and a plurality of rollers positioned between the first wall and the second wall, the plurality of rollers defining at least one belt path. Wherein, two rollers of the plurality of rollers have a combined width configured to substantially span the module width.

One example of this embodiment includes a first support along the first wall of the frame, a second support along the second wall of the frame, and a third support positioned between the first and second support. Wherein, a first roller of the plurality of rollers is rotationally coupled between the first support and the third support. Further wherein, a second roller of the plurality of rollers is rotationally coupled between the second support and the third support.

In another example, the plurality of rollers have a first set of rollers defining a first belt path and positioned on a first side of the module building assembly, and a second set of rollers defining a second belt path and positioned on a second side of the module building assembly. Wherein the first set of rollers is offset from the second set of rollers and the first belt path is different from the second belt path.

Another example includes a roller support cross-member coupled to the first wall on a first end and to the second wall on a second end and a roller support bracket coupled to the roller support cross-member between the first end and the second end. Wherein, a first roller of the plurality of rollers is rotationally coupled to the roller support bracket on a first roller end and to the first wall on a second roller end.

Another example of this embodiment includes a belt alignment assembly that has a roller support cross-member coupled to the first wall and the second wall and having a first adjustable side member proximate to the first wall and a second adjustable side member proximate to the second wall, a roller support bracket coupled to the roller support cross-member between the first end and the second end, a first adjustable roller of the plurality of rollers positioned between the first adjustable side member and the roller support bracket, and a second adjustable roller of the plurality of rollers positioned between the second adjustable side member and the roller support bracket. Wherein, the first adjustable roller is repositionable to change the alignment of the first adjustable roller relative to the roller support cross-member. Further wherein the second adjustable roller is repositionable to change the alignment of the second adjustable roller relative to the roller support cross-member. In another aspect of this example, the at least one belt path further comprises a first belt path and a second belt path wherein the first adjustable roller adjusts the alignment of the first belt path relative to the first and second walls and the second adjustable roller adjusts the alignment of the second belt path relative to the first and second walls.

Another embodiment is a round bale or module building machine having a frame with a first wall and a second wall separated from one another by a module width, a plurality of rollers positioned between the first wall and the second wall, the plurality of rollers defining at least one belt path, and a rockshaft arm assembly pivotally coupled to the module building machine between the first wall and the second wall, the rockshaft arm assembly having a first arm, a second arm, and a third arm, a first rockshaft roller rotationally coupled between the first arm and the second arm along a roller axis, and a second rockshaft roller rotationally coupled between the second arm and the third arm along the roller axis.

In one example of this embodiment, the at least one belt path has a first belt path defined at least partially on the first rockshaft roller, and a second belt path defined at least partially on the second rockshaft roller.

Another example has a support structure coupled to the first arm and the second arm and further coupled to the second arm and the third arm. In one aspect of this example, the support structure is fixedly coupled to the second arm and removably coupled to the first arm and the third arm.

Another example has a first through hole defined through the first arm along the roller axis, a second through hole defined through the second arm along the roller axis, and a third through hole defined through the third arm along the roller axis. Wherein, each of the first, second, and third through holes have a different size relative to one another.

Another example has a shaft positioned along the roller axis and extending from the first arm to the third arm, the first and second rollers being rotationally coupled to the shaft. One aspect of this example has a slot defined in the second arm at least partially along the roller axis. Wherein, the shaft slides through the slot into alignment with the roller axis. Another aspect of this example includes a brace that is removably coupled to the second arm proximate to the slot. Wherein, the brace retains the shaft within the slot when coupled to the second arm. In yet another aspect of this example, the first through hole is sized to allow the shaft to slide therethrough. In another aspect of this example, a first spacer is positioned at least partially within the first through hole and defines a coupler through hole. Wherein, a coupler is positioned through the coupler through hole of the spacer to couple the shaft to the first arm.

Yet another embodiment includes a round bale or module building system with a first member, a second member spaced from the first member, a third member spaced from the second member away from the first member, a first roller rotationally coupled between the first member and the second member, a second roller rotationally coupled between the second member and the third member, and at least one shaft positioned between the first member and the third member. Wherein, the at least one shaft rotationally couples the first roller to the first member and the second member and the second roller to the second member, and third member.

In one example of this embodiment, the first roller is coupled between the first member and the second member along a first roller axis and the second roller is coupled between the second member and the third member along a second roller axis. Wherein, the first roller axis and the second roller axis intersect at the second member. Further wherein, the first roller axis and the second roller axis are offset from one another to bias the first and second rollers away from a belt force applied by a plurality of belts positioned along the first and second rollers.

Another example includes a first and second shaft coupler, the first and second shaft couplers each having a head and a threaded through hole. Wherein the first shaft coupler is positioned through the first member, and the threaded through hole is threadably coupled to the shaft so the head couples the shaft to the first member. Further wherein, the second shaft coupler is positioned through the second member, and the threaded through hole is threadably coupled to the shaft so the head couples the shaft to the second member.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals indicate corresponding parts throughout the several views.

DETAILED DESCRIPTION

The embodiments of the present disclosure described below are not exhaustive and do not limit the disclosure to the precise forms in the following detailed description. Rather, the embodiments are chosen and described so that others skilled in the art may appreciate and understand the principles and practices of the present disclosure.

Figure 1:
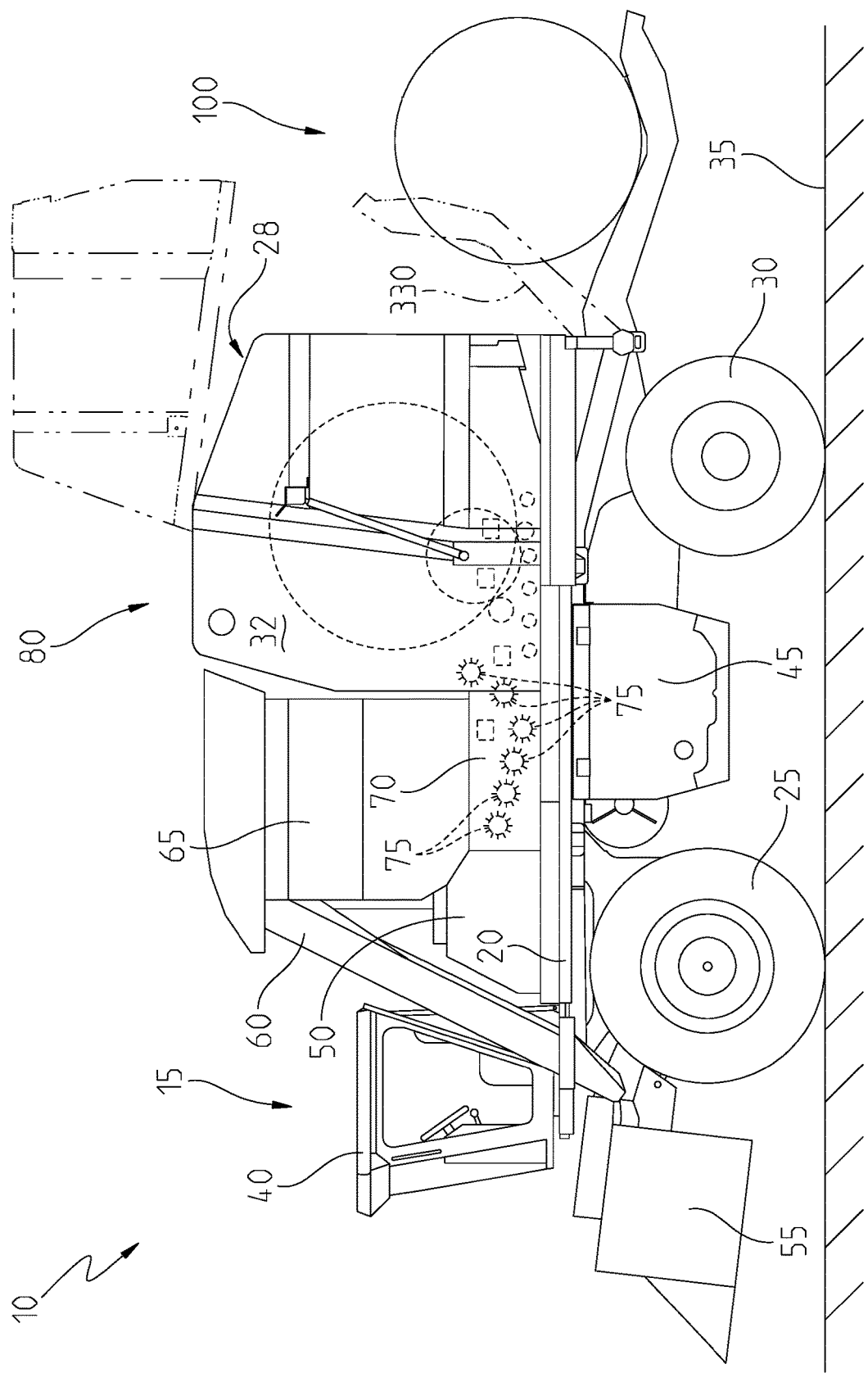
FIG. 1 is a side view of a cotton harvester.

FIG. 1 illustrates a conventional harvester 10 according to one embodiment. The illustrated harvester 10 is a cotton harvester 15. Alternatively, the harvester 10 may be a hay, corn stalk, or any other crop harvester.

The harvester 10 includes a chassis 20. The chassis 20 is supported by front wheels 25 and rear wheels 30. The harvester 10 is adapted for movement through a field 35 to harvest cotton, hay, corn stalks, or any other crop. An operator station 40 is supported by the chassis 20. A power module 45 may be supported below the chassis 20. Water, lubricant, and fuel tanks, indicated generally at 50, may be supported on the chassis 20.

A harvesting structure 55 is couplable to the chassis 20. The illustrated harvesting structure 55 is configured to remove cotton from the field 35. Alternatively, the harvesting structure 55 may be configured to remove hay, corn stalks, or any other crop. An air duct system 60 is couplable to the harvesting structure 55. An accumulator 65 is couplable to the air duct system 60. The accumulator 65 is configured to receive cotton, or other crop, from the harvesting structure 55 via the air duct system 60. A feeder 70 is couplable to the chassis. The feeder 70 is configured to receive cotton, or other crop, from the accumulator 65. The feeder 70 includes a plurality of rollers 75 configured to compress the cotton, or other crop, and transfer the cotton, or other crop, to a round module builder 80. The round module builder 80 has a first wall 28 and a second wall 32.

While a round module builder 80 is shown and described as part of a cotton harvester 15, this disclosure is not limited to such an application of a module builder. More specifically, other embodiments considered for this disclosure include, but are not limited to, a pull type round baler. A pull type round baler may not include a chassis, header, air system, and other components shown on the cotton harvester 15. Rather, the pull behind round baler may have a hitch, wheels, and a crop pickup assembly coupled to the round module builder. A person having skill in the relevant art understands how the teachings of this disclosure can be applied to any round-type baler or module builder and this disclosure is not limited in application to the cotton harvester 15 shown and described herein.

Figure 2:
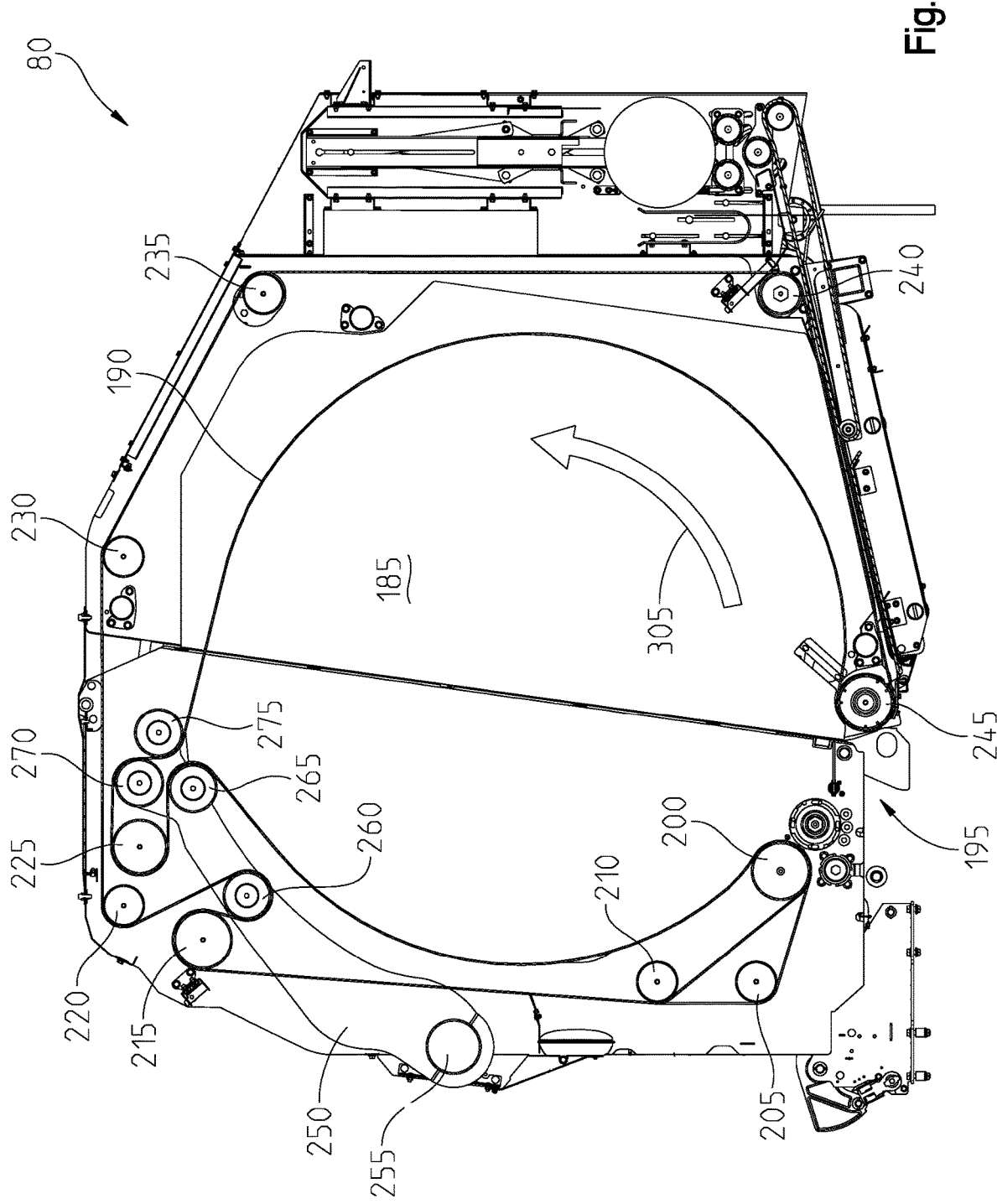
FIG. 2 is a cross-sectional side view of a round module builder.

Referring to FIG. 2, A module-forming chamber 185 may have a plurality of endless belts 190 define the circumference of the module-forming chamber 185. The plurality of endless belts 190 are supported in a side-by-side relationship across a support roll arrangement comprising a plurality of fixed rolls and a plurality of movable rolls. Specifically, proceeding clockwise from a chamber inlet 195 where crop enters the module-forming chamber 185, the fixed rolls include a lower drive roll 200, a first separation roll 205, a second separation roll 210, an upper drive roll 215, an upper front frame roll 220, an upper rear frame roll 225, an upper front gate roll 230, an upper rear gate roll 235, a lower rear gate roll 240, and a lower front gate roll 245 all coupled for rotation within the round module builder 80.

In FIG. 2, a conventional pair of transversely spaced belt tensioning or rockshaft arms 250 are pivotally mounted to a belt tensioning arm pivot 255. The plurality of movable rolls comprise a first movable roll 260, a second movable roll 265, a third movable roll 270, and a fourth movable roll 275, which extend between and have opposite ends, respectively, rotatably coupled to the transversely-spaced belt tensioning arms 250. As illustrated, one or more of the fixed rolls are driven to cause the plurality of endless belts 190 to be driven, with the drive direction being such as to cause the incoming cotton, or other crop, to travel counterclockwise 305 as it is added as a spiral layer to a growing round module 100. As the round module 100 grows within the module-forming chamber 185, the transversely spaced belt tensioning arms 250 rotate counterclockwise until a round module 100 having a predetermined diameter is formed in the module-forming chamber 185.

Referring back to FIG. 1, a module handling system 330 is positioned adjacent the round module builder 80 for receiving the round module 100. The module handling system 330 temporarily supports the round module 100 and then discharges it from the harvester 10.

In operation, the harvester 10 is driven through the field 35 to harvest cotton or other crop. The illustrated harvesting structure 55 picks cotton from cotton plants in the field 35. Alternatively, the harvesting structure 55 may strip the cotton from the cotton plants. Cotton is then transferred to the accumulator 65 via the air duct system 60. The accumulator 65 holds the cotton until a predetermined cotton level is reached and then transfers the cotton to the feeder 70. In an exemplary embodiment, the accumulator 65 transfers cotton to the feeder 70 approximately four times for each round module 100 produced. When the feeder 70 receives cotton, the plurality of rollers 75 are activated to compress the cotton. The compressed cotton is transferred to the round module builder 80.

After the round module builder 80 receives compressed cotton, the plurality of endless belts 190 rotate the cotton into the round module 100. After the round module builder 80 receives sufficient cotton from the feeder 70, the round module may be wrapped and the round module 100 can be ejected onto the module handling system 330. The module handling system 330 supports the round module 100 and then discharges it from the harvester 10. The harvester 10 is adapted for movement through a field 35 to harvest cotton.

Figure 3:
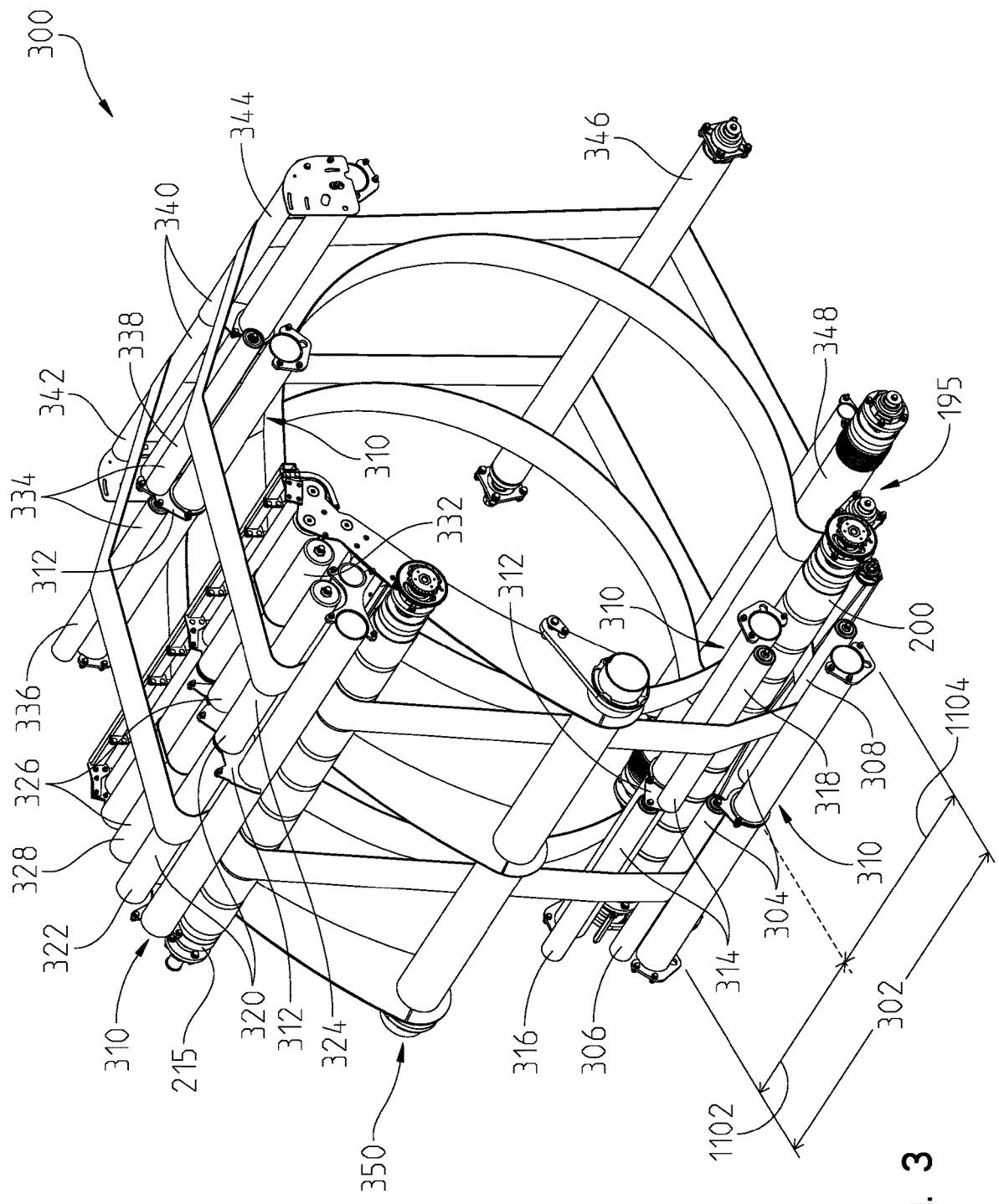
FIG. 3 is an elevated perspective view of one embodiment of a roller assembly for a round module builder.

Referring now to FIG. 3, one embodiment of a roller assembly 300 of the present disclosure is shown. More specifically, the roller assembly 300 is shown isolated from the exterior structure of the module builder 80. Accordingly, while not expressly shown in FIG. 3, the roller assembly 300 is positioned between the first wall 28 of the module builder 80 and the second wall 32 of the module builder 80. The first and second walls 28, 32 of the module builder 80 being spaced from one another the module width 302. Further, the embodiment of FIG. 3 may have a chamber inlet 195, lower drive roll 200, upper drive roll 215, lower rear gate roll 240 and lower front gate roll 245 that function substantially the same as those described above for FIGS. 1-2. However, the embodiment of FIG. 3 incorporates a plurality of split rollers to span the module width 302. The module width 302 may be the width of the round bale or module after it is ejected from the module handling system 330.

In the embodiment of FIG. 3, a first separation roll assembly 304 may be positioned at a similar location as the first separation roll 205 described above for FIG. 2. However, the first separation roll assembly 304 may have a first and second first separation roller 306, 308 positioned to be combined to substantially span the module width 302 instead of just one separation roll 205 as shown and described for FIG. 2. More specifically, a roller support cross-member 310 (see FIG. 8b for an isolated view of a roller support cross-member 310) may be coupled between the first wall and a second wall of the module builder 80. The roller support cross-member 310 may have a roller support bracket 312 positioned between the first and second walls and providing a coupling location for the first and second rollers 306, 308 for the first separation roller assembly 304. More specifically, the first roller 306 may be rotationally coupled to the first wall on one end and to the roller support bracket 312 on the other end. Similarly, the second roller 308 may be rotationally coupled to the second wall on one end and to the roller support bracket 312 on the other end.

As will be described in more detail below, the axis of rotation for the first and second rollers 306, 308 of the first separation assembly 304 may be offset from one another. However, the combined width of the first and second roller 306, 308 may be sized to substantially span the module width 302 when coupled to the roller support 310 as described above. In one non-exclusive example, the roller support bracket 312 may be positioned between the first and second wall 28, 32 to define a first side 1102 and a second side 1104. In the exemplary embodiment of FIG. 3, the first and second side 1102, 1104 may each be substantially half the module width 302, but this disclosure is not limited to such a configuration. More specifically, in a different embodiment the first side 1102 may have a width greater than a width of the second side 1104. Further still, in another embodiment the second side 1104 has a width greater than the first side 1102. Accordingly, this disclosure is not limited to any particular location of the roller support bracket 312 between the first and second wall 28, 32 and considers embodiments that utilize rollers of different widths between the first side 1102 and the second side 1104 to span the module width 302.

A second separation roll assembly 314 may be positioned at a similar location as the second separation roll 210 described above for FIG. 2. However, the second separation roll assembly 314 may have a first and second roller 316, 318 positioned to be combined to substantially span the module width 302 instead of just one second separation roll 205 as shown and described for FIG. 2. The second separation roll assembly 314 may utilize a similar roller support cross-member 310 as described above for the first separation roll assembly 304. More specifically, the first roller 316 of the second separation roller assembly 314 may be rotationally coupled to the first wall on one end and to the roller support bracket 312 on the other. Similarly, the second roller 318 of the second separation roller assembly 314 may be rotationally coupled to the second wall on one end and to the roller support bracket 312 on the other end.

The axis of rotation for the first and second rollers 316, 318 of the second separation assembly 314 may be offset from one another. However, the combined width of the first and second roller 316, 318 may be sized to substantially span the module width 302 when coupled to the roller support 310 as described above.

An upper front frame roll assembly 320 may be positioned at a similar location as the upper front frame roll 220 described above for FIG. 2. However, the upper front frame roll assembly 320 may have a first and second roller 322, 324 positioned to be combined to span the module width 302 instead of just one upper front frame roll 220 as shown and described for FIG. 2. The upper front frame roll assembly 320 may utilize a similar roller support cross-member 310 as described above for the first separation roll assembly 304. More specifically, the first roller 322 of the upper front frame roll assembly 320 may be rotationally coupled to the first wall on one end and to the roller support bracket 312 on the other. Similarly, the second roller 324 of the upper front frame roll assembly 320 may be rotationally coupled to the second wall on one end and to the roller support bracket 312 on the other end.

The axis of rotation for the first and second rollers 322, 324 of the upper front frame roll assembly 320 may be offset from one another. However, the combined width of the first and second roller 322, 324 may be sized to substantially span the module width 302 when coupled to the roller support 310 as described above.

An upper rear frame roll assembly 326 may be positioned at a similar location as the upper rear frame roll 225 described above for FIG. 2. However, the upper rear frame roll assembly 326 may have a first and second roller 328, 332 positioned to be combined to span the module width 302 instead of just one upper rear frame roll 225 as shown and described for FIG. 2. The upper rear frame roll assembly 326 may utilize a similar roller support cross-member 310 as described above for the first separation roll assembly 304. More specifically, the first roller 328 of the upper rear frame roll assembly 326 may be rotationally coupled to the first wall on one end and to the roller support bracket 312 on the other. Similarly, the second roller 332 of the upper rear frame roll assembly 326 may be rotationally coupled to the second wall on one end and to the roller support bracket 312 on the other end.

The axis of rotation for the first and second rollers 328, 332 of the upper rear frame roll assembly 326 may be offset from one another. However, the combined width of the first and second roller 328, 332 may be sized to substantially span the module width 302 when coupled to the roller support 310 as described above.

An upper front gate roll assembly 334 may be positioned at a similar location as the upper front gate roll 230 described above for FIG. 2. However, the upper front gate roll assembly 334 may have a first and second roller 336, 338 positioned to be combined to span the module width 302 instead of just one upper front gate roll 230 as shown and described for FIG. 2. The upper front gate roll assembly 334 may utilize a similar roller support cross-member 310 as described above for the first separation roll assembly 304. More specifically, the first roller 336 of the upper front gate roll assembly 334 may be rotationally coupled to the first wall on one end and to the roller support bracket 312 on the other. Similarly, the second roller 338 of the upper front gate roll assembly 334 may be rotationally coupled to the second wall on one end and to the roller support bracket 312 on the other end.

The axis of rotation for the first and second rollers 336, 338 of the upper front gate roll assembly 334 may be offset from one another. However, the combined width of the first and second roller 336, 338 may be sized to substantially span the module width 302 when coupled to the roller support 310 as described above.

An upper rear gate roll assembly 340 may be positioned at a similar location as the upper rear gate roll 235 described above for FIG. 2. However, the upper rear gate roll assembly 340 may have a first and second roller 342, 344 positioned to be combined to span the module width 302 instead of just one upper rear gate roll 235 as shown and described for FIG. 2. The upper rear gate roll assembly 340 may utilize a similar roller support cross-member 310 as described above for the first separation roll assembly 304. More specifically, the first roller 342 of the upper rear gate roll assembly 340 may be rotationally coupled to the first wall on one end and to the roller support bracket 312 on the other. Similarly, the second roller 344 of the upper rear gate roll assembly 340 may be rotationally coupled to the second wall on one end and to the roller support bracket 312 on the other end.

The axis of rotation for the first and second rollers 342, 344 of the upper rear gate roll assembly 340 may be offset from one another. However, the combined width of the first and second roller 342, 344 may be sized to substantially span the module width 302 when coupled to the roller support 310 as described above.

The embodiment of FIG. 3 illustrates a lower rear gate roller 346 that is substantially the same as the lower rear gate roll 240 of FIG. 2. More specifically, the lower rear gate roller 346 may be substantially one roller that spans the module width 302. However, in a different embodiment, the lower rear gate roller 346 may be two separate rollers as described above and this disclosure is not limited to a lower rear gate roller that is one roller.

Similarly, the embodiment of FIG. 3 also illustrates a lower front gate roller 348 that is substantially the same as the lower front gate roll 245 of FIG. 2. More specifically, the lower front gate roller 348 may be substantially one roller that spans the module width 302. However, in a different embodiment, the lower front gate roller 348 may be two separate rollers as described above and this disclosure is not limited to a lower front gate roller that is one roller.

The roller assembly 300 of FIG. 3 may also have a rockshaft assembly 350 similar to the belt tensioning arms 250 described above. However, the rockshaft assembly 350 may utilize two separate rollers to span the module width 302 where the rollers from the belt tensioning arms 250 utilized only one roller to span the module width 302 as will be shown and described with reference to FIG. 4.

Figure 4:
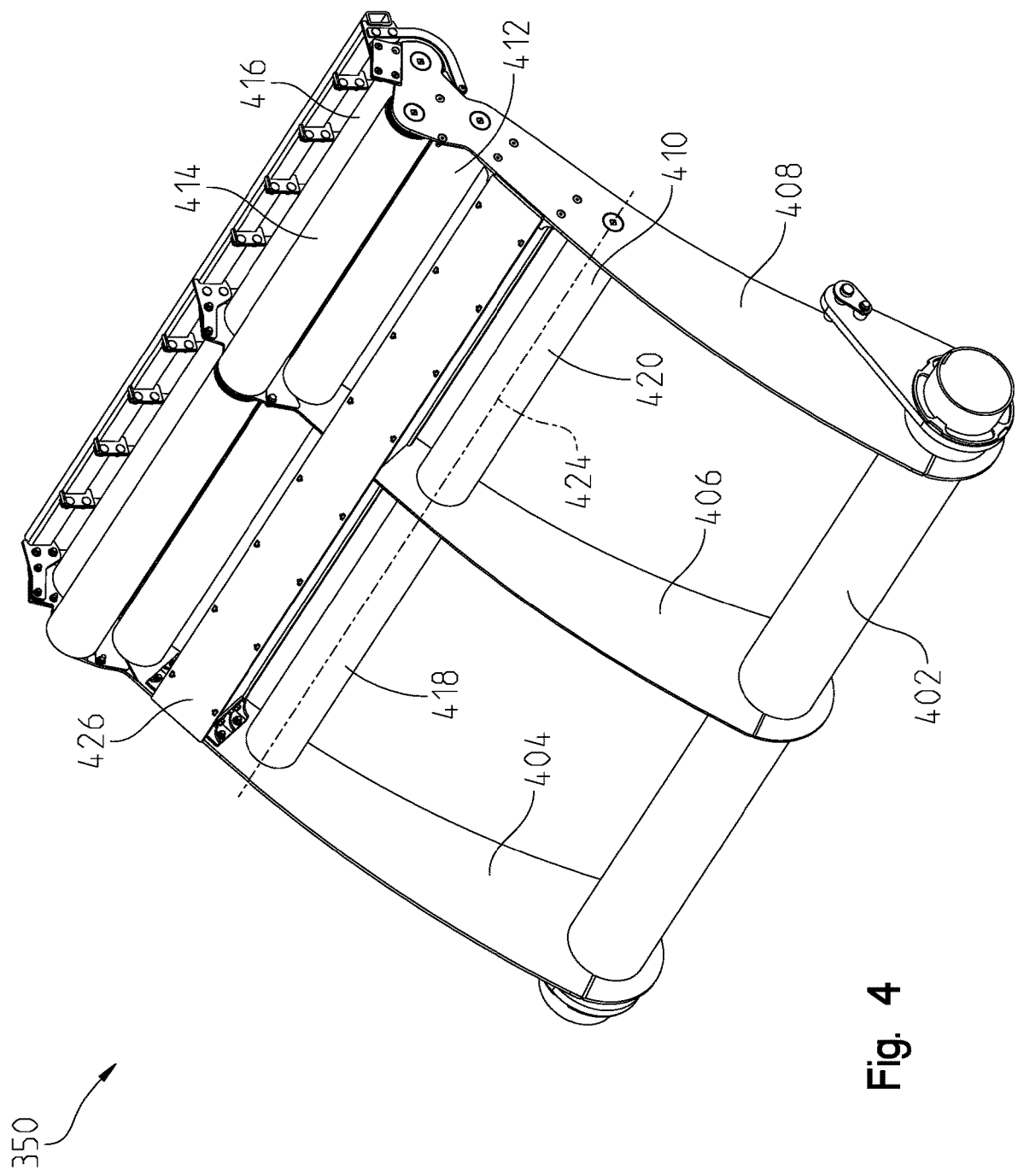
FIG. 4 is an isolated perspective view of a rockshaft arm assembly.

Referring now to FIG. 4, the rockshaft assembly 350 is illustrated isolated from the remaining components of the roller assembly 300. The rockshaft assembly 350 may have a frame pivot 402 pivotally coupled between the first and second wall and spanning the module width 302. Further, coupled to the frame pivot 402 may be a first arm 404, a second arm 406, and a third arm 408. The arms 404, 406, 408 may be coupled to the frame pivot 402 on one end and extend away therefrom to provide mounting locations for a plurality of rollers as will be described in more detail below.

A first, second, third, and fourth movable roller assembly 410, 412, 414, 416 may be located at similar locations as described above for the first, second, third, and fourth movable roll 260, 265, 270, 275. Further, the movable roller assemblies 410, 412, 414, 416 may also function in substantially the same way as described above for the movable rolls 260, 265, 270, 275. However, the first, second, third, and fourth movable roller assemblies 410, 412, 414, 416 may each utilize a first and second roller to span the module width 302 rather than utilizing a single roller as described above for the movable rolls 260, 265, 270, 275.

More specifically, the first movable roller assembly 410 may have a first roller 418 rotatably coupled to the first arm 404 on one end and to the second arm 406 on the other end. Similarly, the first movable roller assembly 410 may have a second roller 420 rotatably coupled to the second arm 406 on one end and to the third arm 408 on the other end. In one embodiment of this disclosure, both the first roller 418 and the second roller 420 are aligned along, and rotate about a first axis 424.

Similarly, the second, third, and fourth movable roller assemblies 412, 414, 416 may also each have a first roller rotatably coupled between the first arm 404 and the second arm 406 and a second roller rotatably coupled between the second arm 406 and the third arm 408. In one embodiment of this disclosure, both the first roller and the second roller of the respective second, third, and fourth roller assemblies 412, 414, 416 are aligned along, and rotate about a corresponding second, third, and fourth axis. The second, third, and fourth movable roller assemblies 412, 414, 416 may be configured in substantially the same way as described above for the first movable roller assembly 410. Accordingly, the description provided above for the first movable roller assembly 410 also applies respectively to the second, third, and fourth movable roller assemblies 412, 414, 416.

In one aspect of this disclosure, a support structure 426 may be positioned between the first arm 404 and the second arm 406 and the second arm 406 and the third arm 408. In one embodiment, the support structure 426 is fixedly coupled to the second arm 406 and removably coupled to both the first and third arm 404, 408. More specifically, in this embodiment the support structure 426 may be welded, glued, integrally formed with, or otherwise fixedly coupled to the second arm 406 and extend towards both the first arm 404 and the third arm 408. The support structure 426 may then be removably coupled to the corresponding first and second arms 404, 408 via any common removable coupling mechanism. In one embodiment, the support structure 426 may be bolted, riveted, or otherwise clamped or coupled to the corresponding first and third arm 404, 408.

In other embodiments, the support structure 426 may be two separate components; a first component spaced between the first arm 404 and the second arm 406 and a second component spaced between the second arm 406 and the third arm 408. In this embodiment, the support structure 426 may be coupled to the corresponding arms 404, 406, 408 via any of the coupling methods described herein. Accordingly, this disclosure is not limited to any particular coupling configuration between the support structure 426 and the corresponding first, second, and third arms 404, 406, 408.

Figure 5:
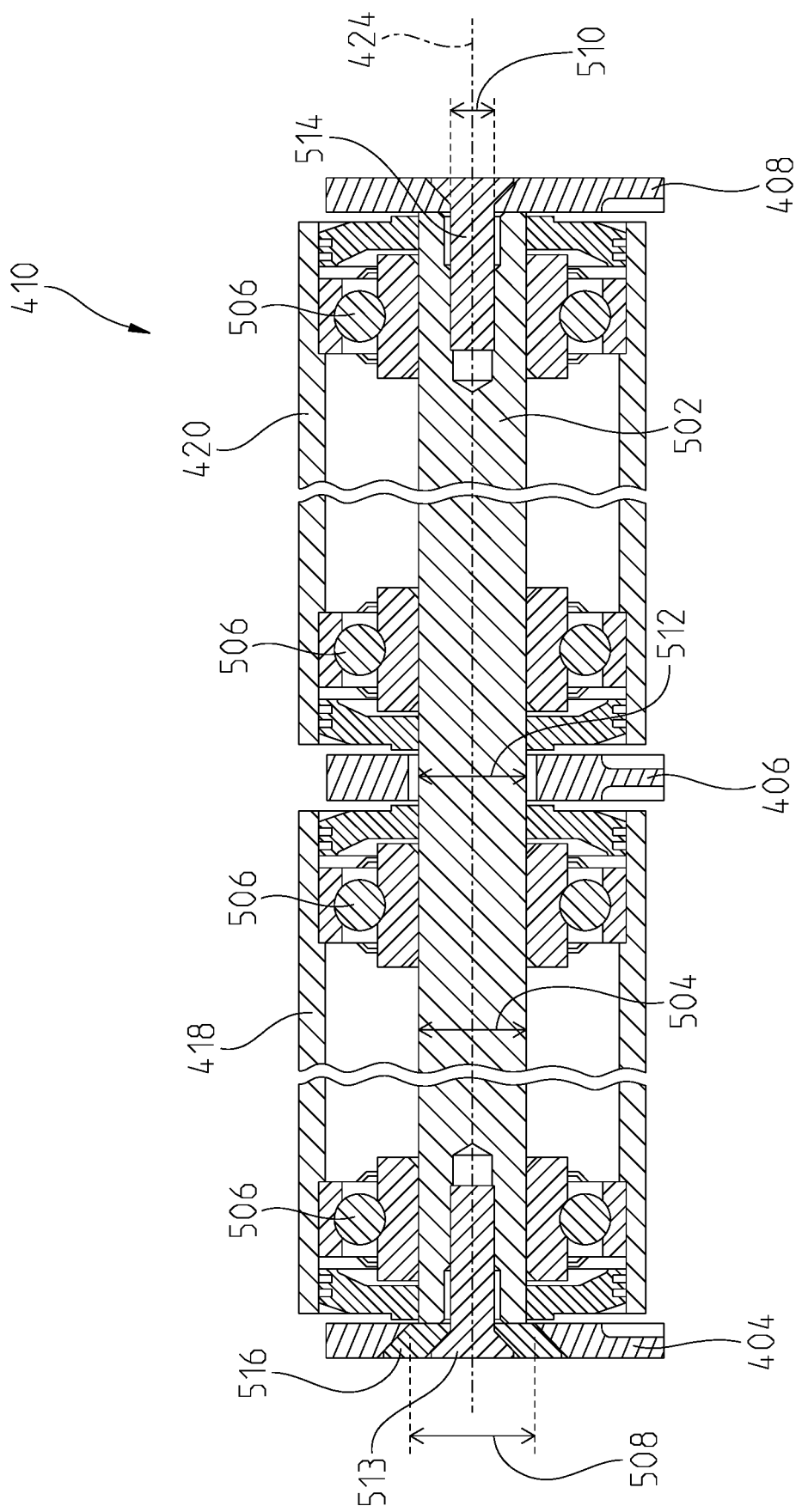
FIG. 5 is a section view for one embodiment of a roller assembly.

As described above, the first roller 418 and the second roller 420 of the first movable roller assembly 410 may be positioned along the first axis 424. Referring now to FIG. 5, one non-exclusive method of coupling the first and second roller 418, 420 to the respective arms 404, 406, 408 is illustrated. More specifically, FIG. 5 shows a cross-sectional view of the first movable roller assembly 410 through the first axis 424. In FIG. 5, a shaft 502 is illustrated coupled to the first arm 404, passing through the second arm 406, and coupled to the third arm 408. In the embodiment of FIG. 5, the shaft 502 may rotationally couple the corresponding first and second rollers 418, 420 thereto via bearings 506. Accordingly, the shaft 502 may be rigidly mounted to the corresponding arms 404, 406, 408 and the rollers 418, 420 may rotate thereabout via the bearings 506.

In the embodiment of FIG. 5, the shaft 502 has a shaft width 504. The shaft width 504 may be slightly smaller than the width of a first arm opening 508 but larger than the width of a third arm opening 510. Further, the shaft width 504 may substantially correspond with the width of a second arm opening 512. Accordingly, in one aspect of the present embodiment the rollers 418, 420 may be aligned with the first axis 424 before the shaft 502 is positioned therein. Then, the shaft 502 may slide through the first arm opening 508 and the corresponding bearings 506 of the first roller 418 and pass through the second arm opening 512. The shaft 502 may continue through the bearings 506 of the second roller 420 until it contacts the third arm 408.

Once the shaft 502 is positioned between the first and third arm 404, 408, a first coupler 513 may be coupled to the shaft 502 at the first arm 404 and a second coupler 514 may be coupled to the shaft at the third arm 408. Further, in the embodiment shown in FIG. 5, a first coupler spacer 516 may provide sufficient spacing to allow the first coupler 513 to span the first arm opening 508 and to clampedly couple the shaft 502 between the first arm 404 and the third arm 408. Accordingly, when the first coupler 513 is positioned through the first coupler spacer 516 and the second coupler 514 is positioned through the third arm opening 510, the first and third arm 404, 408 may provide a clamping force on the shaft 502, thereby holding the arms 404, 408 at defined distance from one another.

While the first movable roller assembly 410 is referred to directly herein when describing the embodiment illustrated in FIG. 5, the embodiment of FIG. 5 is also considered herein for each of the second, third, and fourth movable roller assembly 412, 414, 416. More specifically, all of the roller assemblies 410, 412, 414, 416 may utilize a similar shaft, couplers, spacers, and sizing configuration described above with reference to FIG. 5 and this disclosure is not limited in application of the embodiment of FIG. 5 to the first moveable roller assembly 410. Further still, any roller on a module builder could implement the teachings shown and described with reference to FIG. 5. Accordingly, this disclosure considers applying the teachings of FIG. 5 to any roll or roller assembly on a bale or module builder.

Figure 6:
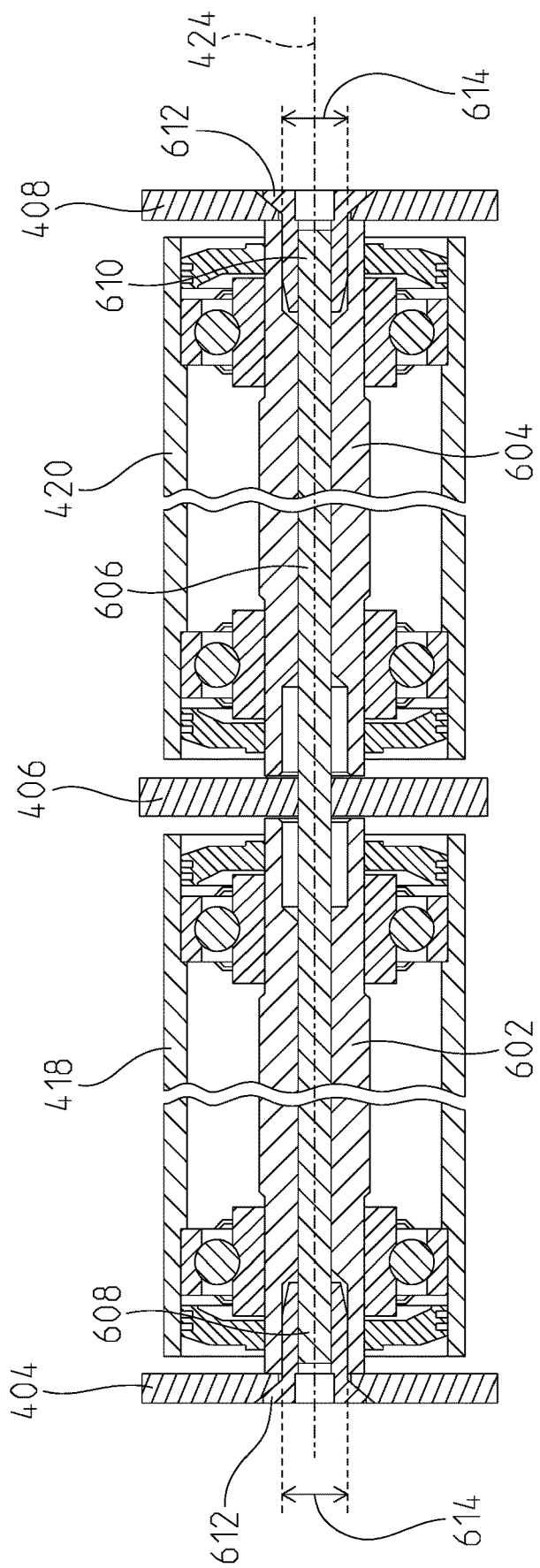
FIG. 6 is a section view of a different embodiment of a roller assembly.

Referring now to FIG. 6, a different embodiment for mounting the rollers 418, 420 is illustrated. In this embodiment, there may be a first shaft 602 that corresponds with the first roller 418 and a second shaft 604 that corresponds with the second roller 420. In this embodiment, the first shaft 602 may be sized to fit between an inner surface of the first arm 404 and the surface of the second arm 406 facing the first arm 404. Similarly, the second shaft 604 may be sized to fit between an inner surface of the third arm 408 and the surface of the second arm 406 facing the third arm 408. In this embodiment, however, the first and second shaft 602, 604 have a hollow core sized to allow a central shaft 606 to be positioned therethrough. More specifically, the central shaft 606 extends approximately from about the first arm 404 to about the third arm 408 and thereby holds the first and second shaft 602, 604 in alignment with the first axis 424.

In the embodiment of FIG. 6, the central shaft 606 may be threaded on a first end 608 and a second end 610. Further, couplers 612 may have a threaded through hole and be configured to threadably couple to the corresponding first and second end 608, 610 of the central shaft 606. In this embodiment, the first arm 404 and the third arm 408 may have a coupler through hole 614 sized to be smaller than the width of the first and second shafts 602, 604 but greater than the width of the central shaft 606. Accordingly, the central shaft 606 can slide through the first arm 404, the first shaft 602, the second arm 406, the second shaft 604 and the third arm 408 when the components are aligned with the first axis 424.

In one aspect of the embodiment of FIG. 6, the couplers 612 may be sized to become at least partially positioned within the corresponding shaft 602, 604 as the couplers 612 are threadably coupled to the central rod 606. Further still, the couplers 612 may have an expanded head that corresponds with a countersunk portion of the first or third arm 404, 408. Accordingly, as the couplers 612 are threadably coupled to the central shaft 606, the expanded heads of the couplers 612 contact the respective arms 404, 408 to draw them together with a compressive load, which is distributed through the first and second shafts 602, 604. Further, in addition to applying the compressive load on the respective arms 404, 408, the couplers 612 center the shafts 602, 604 along the first axis 424 by becoming positioned at least partially within a corresponding coupler opening of the shafts 602, 604.

While the first movable roller assembly 410 is referred to directly herein when describing the embodiment illustrated in FIG. 6, the embodiment of FIG. 6 is also considered herein for each of the second, third, and fourth movable roller assembly 412, 414, 416. More specifically, all of the roller assemblies 410, 412, 414, 416 may utilize a similar shaft, couplers, spacers, and sizing configuration described above with reference to FIG. 6 and this disclosure is not limited in application of the embodiment of FIG. 6 to the first moveable roller assembly 410. Further still, any roller on a module builder could implement the teachings shown and described with reference to FIG. 6. Accordingly, this disclosure considers applying the teachings of FIG. 6 to any roll or roller assembly on a bale or module builder.

Figure 7A:
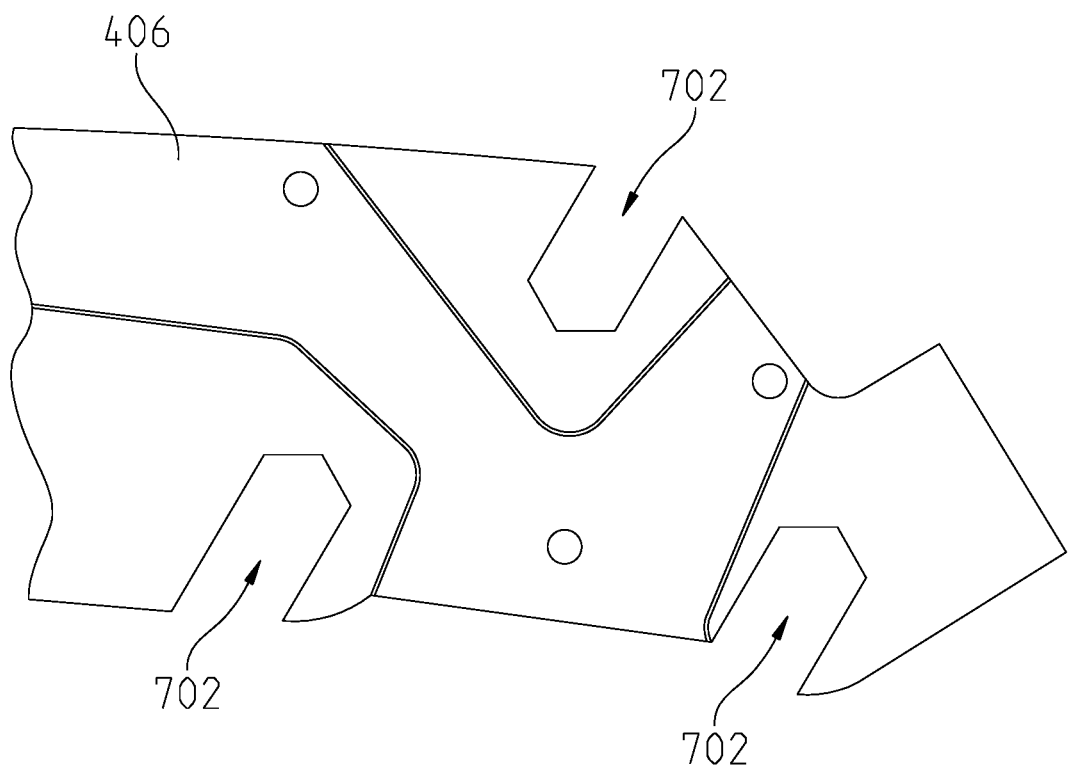
FIG. 7a is an elevated perspective view of one embodiment of a rockshaft arm with clamps removed.
Figure 7B:
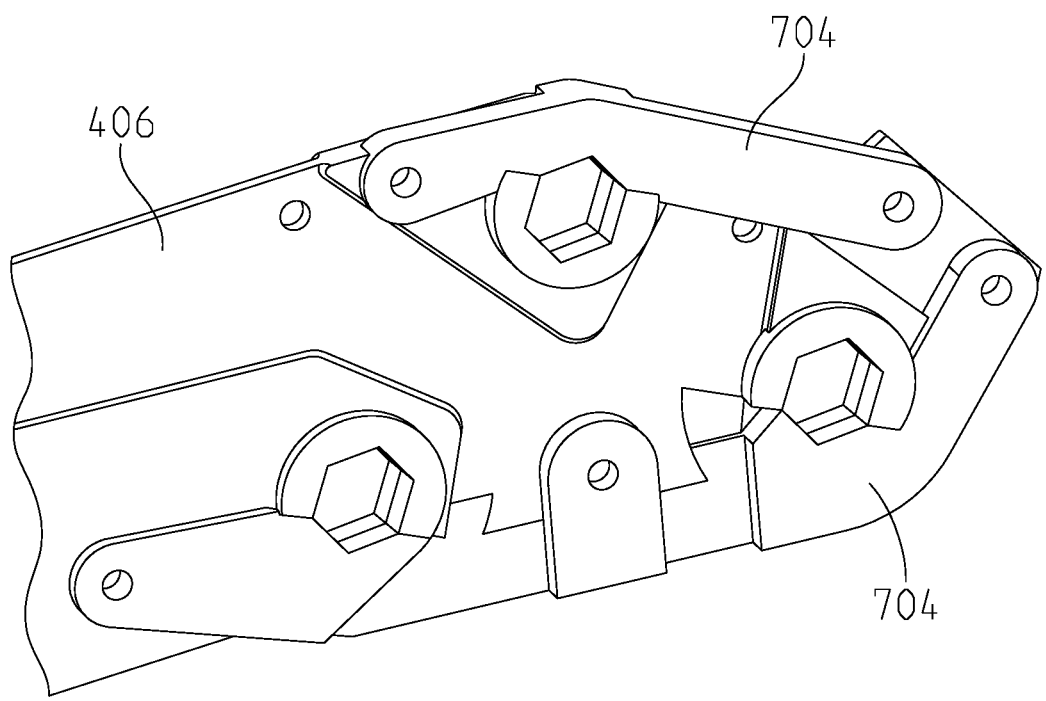
FIG. 7b is an elevated perspective view of the rockshaft arm of FIG. 7a with clamps positioned thereon.

Referring now to FIGS. 7a and 7b, one exemplary embodiment of the second arm 406 is shown. In FIG. 7a, slots 702 are shown at locations that correspond with the second, third, and fourth movable roller assemblies 412, 414, 416. In this embodiment, the corresponding rollers may be coupled to a shaft prior to being coupled to the corresponding arms 404, 406, 408. More specifically, the slots 702 may allow the first and second rollers of the corresponding movable roller assemblies 412, 414, 416 to be pre-installed on a shaft. Then, the movable roller assemblies 412, 414, 416 can be placed in their corresponding slot 702 and coupled to the first and third arm 404, 408 utilizing one of the techniques described above. Further, once the movable roller assemblies 412, 414, 416 are positioned within the corresponding slots 702, slot clamps 704 may be positioned at least partially over the corresponding slots 702, thereby locking the movable roller assemblies 412, 414, 416 in proper alignment with the first, second, and third arms 404, 406, 408.

Figure 8A:
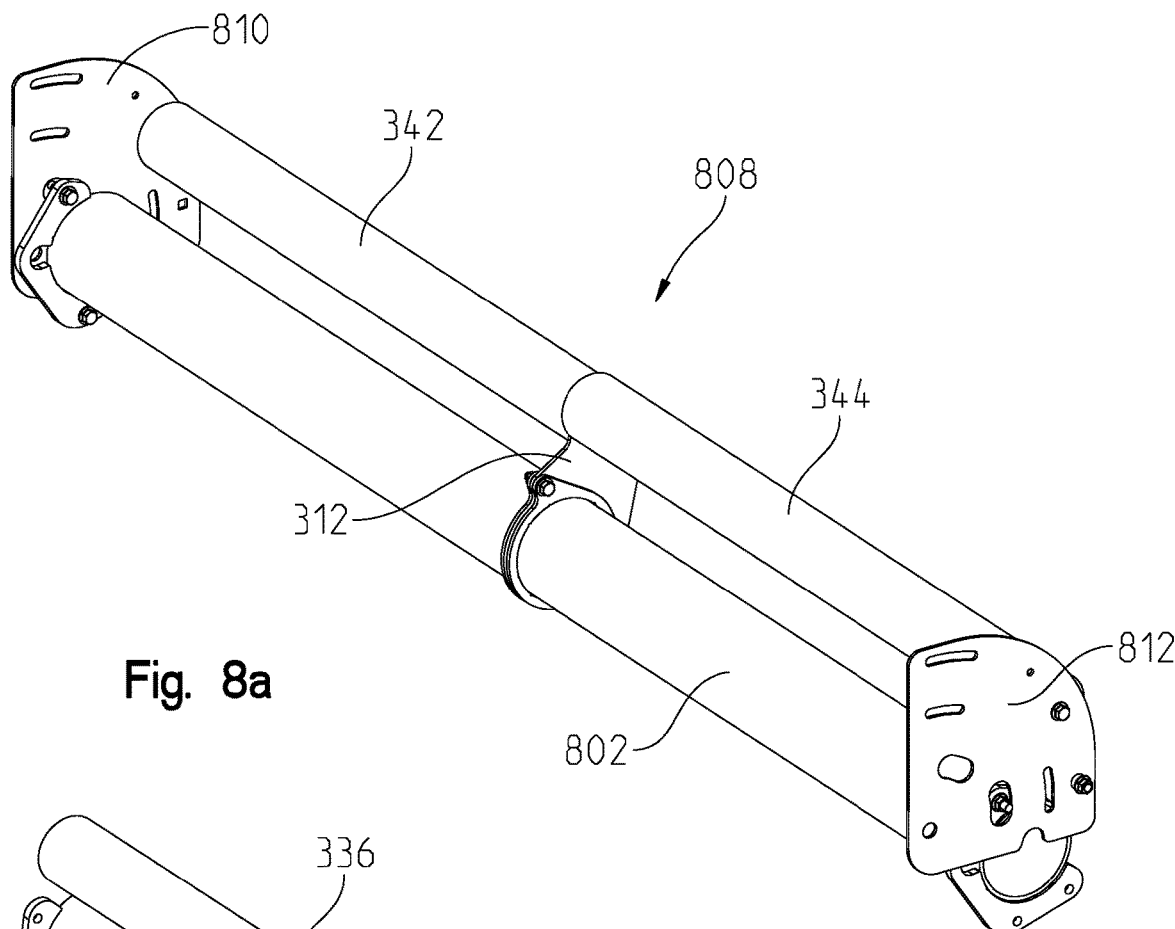
FIG. 8a is an elevated perspective view of a belt alignment assembly.

Referring to FIG. 8a, a belt alignment assembly 808 is illustrated. The belt alignment assembly 808 may have a structural component 802 and a roller support bracket 312 similar to that of the roller support member 310. However, the belt alignment assembly 808 also has a first side belt alignment mechanism 810 and a second side belt alignment mechanism 812. The first and second belt alignment mechanisms 810, 812 are configured to allow the corresponding adjacent ends of the corresponding roller 342, 344 to be moved relative to the end of the rollers adjacent to the roller support bracket 312. In other words, the first and second belt alignment mechanisms 810, 812 provide a location to change the alignment of the plurality of endless belts positioned along the corresponding first roller 342 or second roller 344 as will be described in more detail with reference to FIG. 9.

Figure 8B:
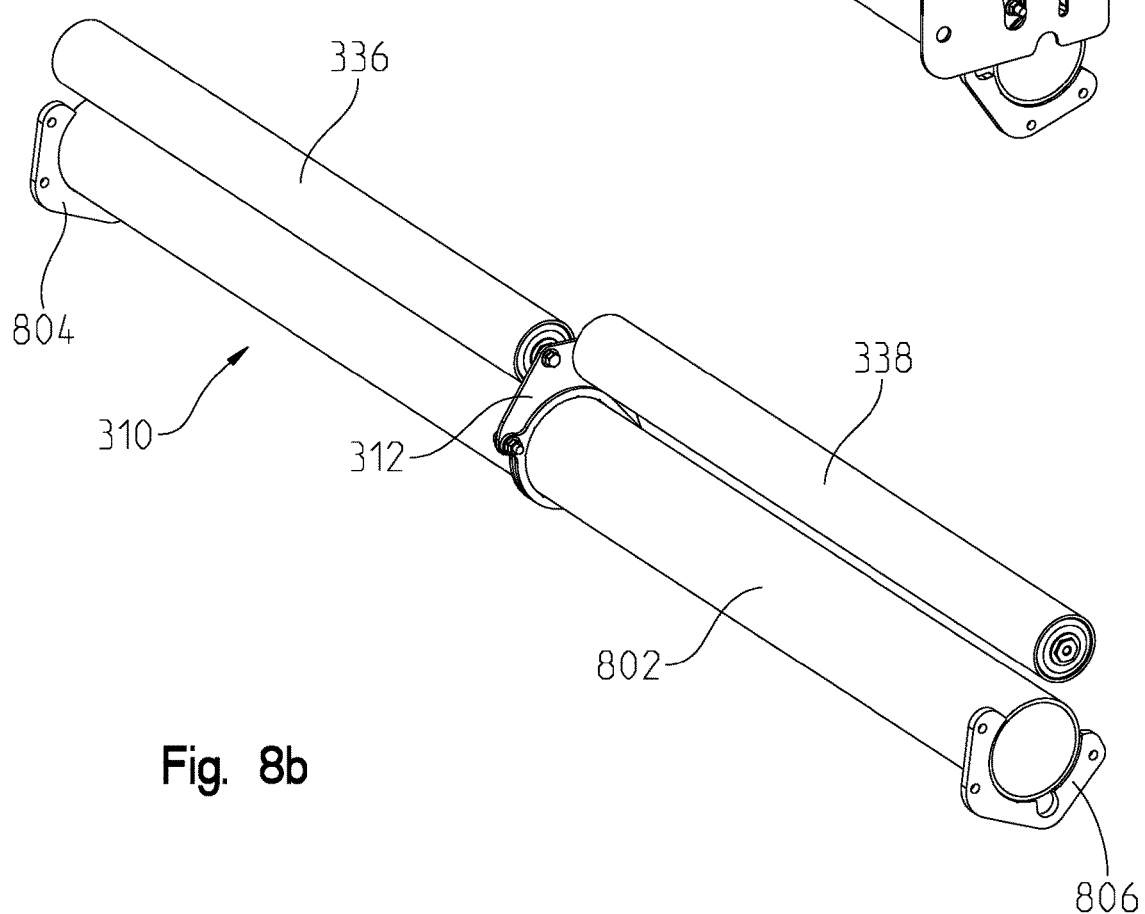
FIG. 8b is an elevated perspective view of a roller support cross-member.

Referring now to FIG. 8b, an isolated example of a roller support member 310 is shown. The roller support member 310 may also have a substantially structural component 802 that is coupled to the first wall on a first side 804 and coupled to the second wall on the second side 806. The structural component 802 may be positioned in a cavity away from the plurality of endless belts to avoid contact therewith. Further, the structural component may be coupled at the first and second side 804, 806 to provided sufficient structural support to substantially prevent the roller support bracket 312, and in turn, the first and second rollers 336, 338 from substantially deflecting under a belt load.

Figure 9:
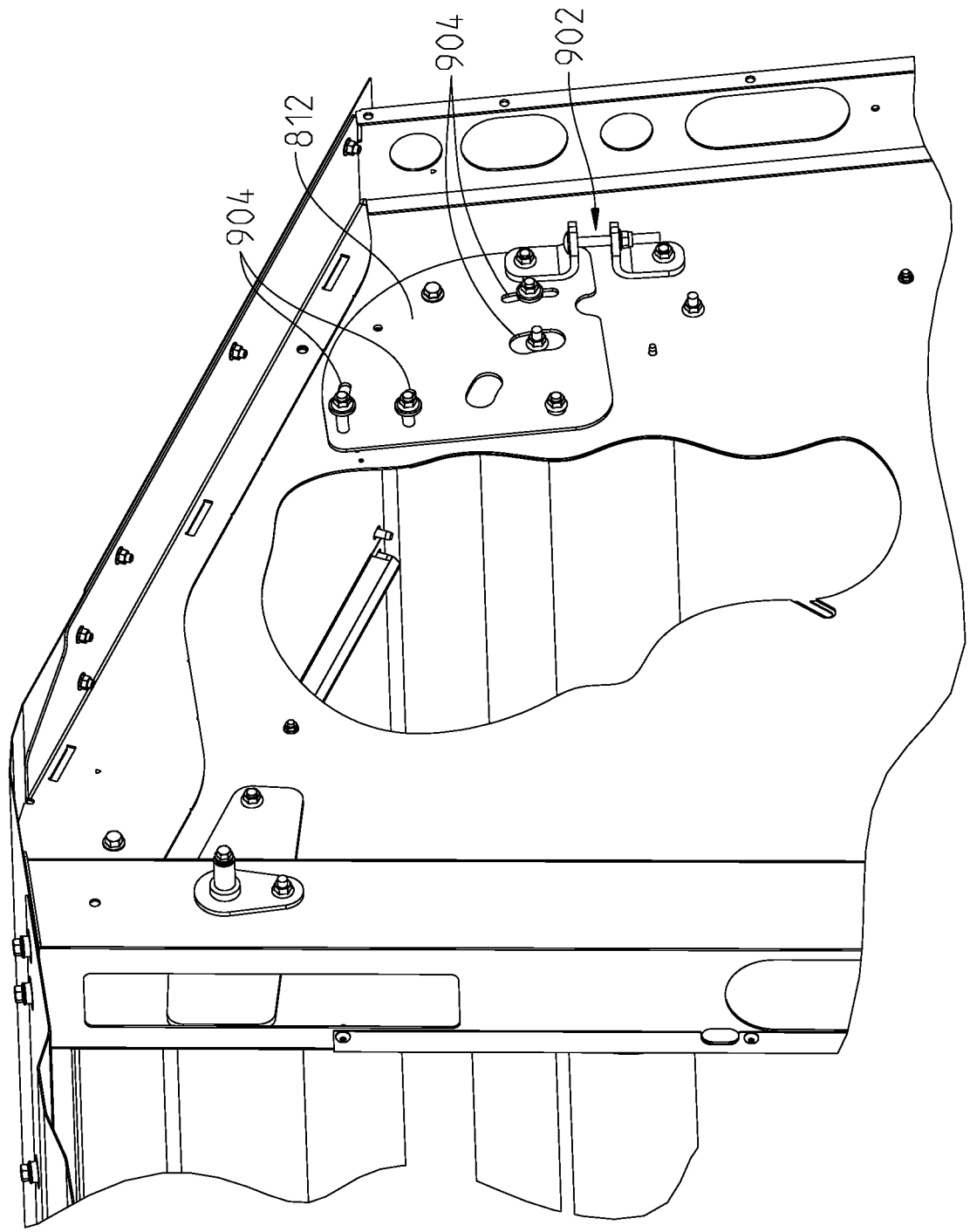
FIG. 9 is an elevated perspective view of the belt alignment assembly of FIG. 8a coupled to a side wall.

Referring now to FIG. 9, one assembly for adjusting the first and second belt alignment mechanisms 810, 812 is shown. More specifically, in this embodiment a setscrew 902 may be coupled to the second belt alignment mechanisms 812 and the second wall 32. Further, the second belt alignment mechanisms 812 may be pivotally coupled to the second wall via a plurality of slots 904. The plurality of slots 904 may be selectively coupled to the second wall via nuts and bolts or any other know clamping fastener. When the second roller 344 needs adjusted (thereby adjusting the tension and alignment of the plurality of belts positioned thereon), the fasteners on the second belt alignment mechanisms 812 may be loosened to allow the set screw 902 to manipulate the location of the second belt alignment mechanisms 812, and thereby the second end of the second roller 344.

While FIG. 9 only refers to the second belt alignment mechanisms 812, this embodiment is equally applicable to the first belt alignment mechanisms 810. Accordingly, the description above regarding the second belt alignment mechanisms 812 is also hereby incorporated as appropriate for the first belt alignment mechanisms 810.

Further, while a particular way of modifying one end of a roller to thereby modify the tension and alignments of any belts positioned thereon has been shown and described herein, this disclosure is not limited to only the method described. More specifically, in one embodiment one end of the roller may be positioned in a slot of the corresponding wall and may be repositioned therein via a bolt, clamp, or other similar fastener. Accordingly, this disclosure considers any known method of selectively positioning a bolt or the like at different locations through a surface.

Figure 10:
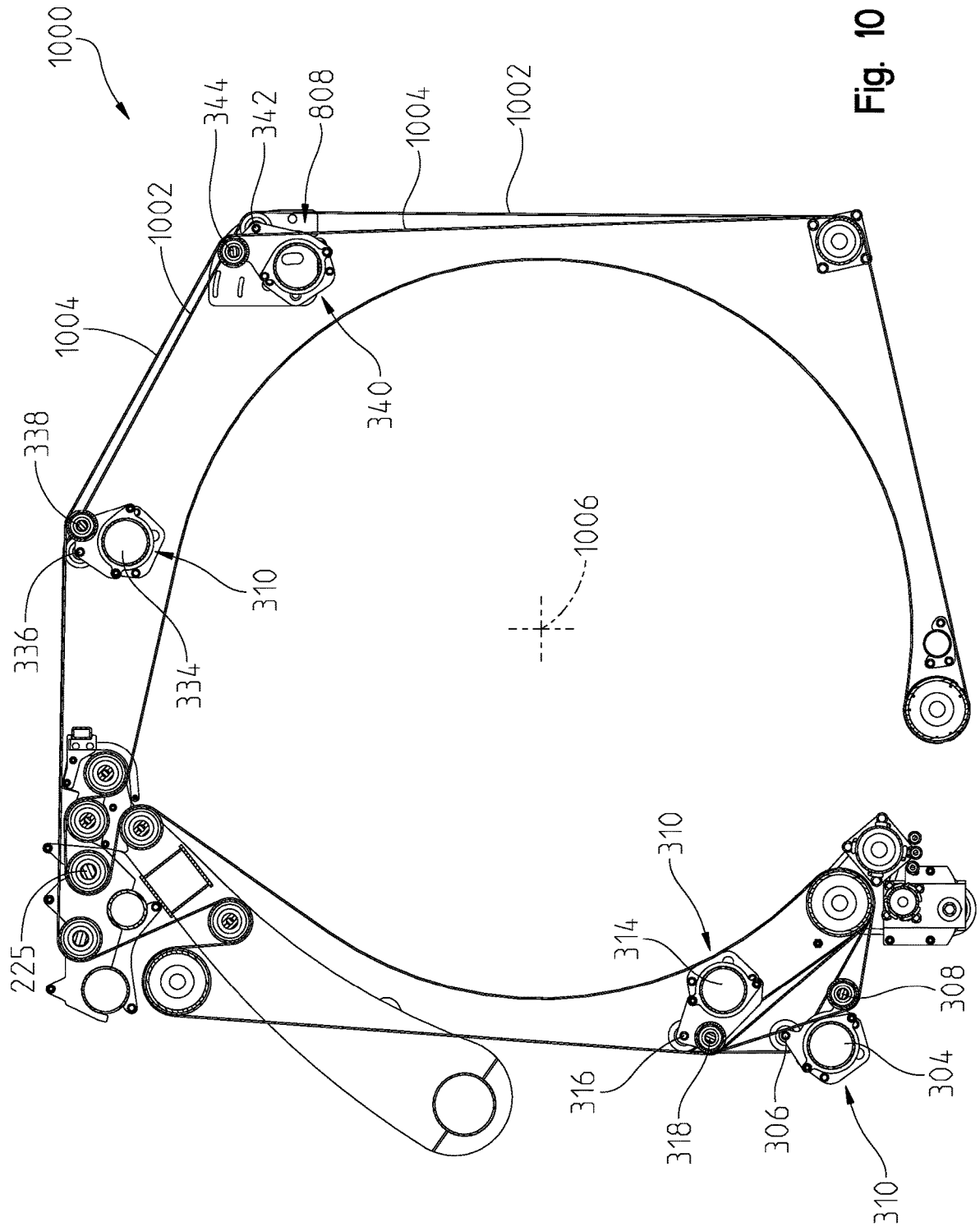
FIG. 10 is a side view of a belt routing configuration.
Figure 11A:
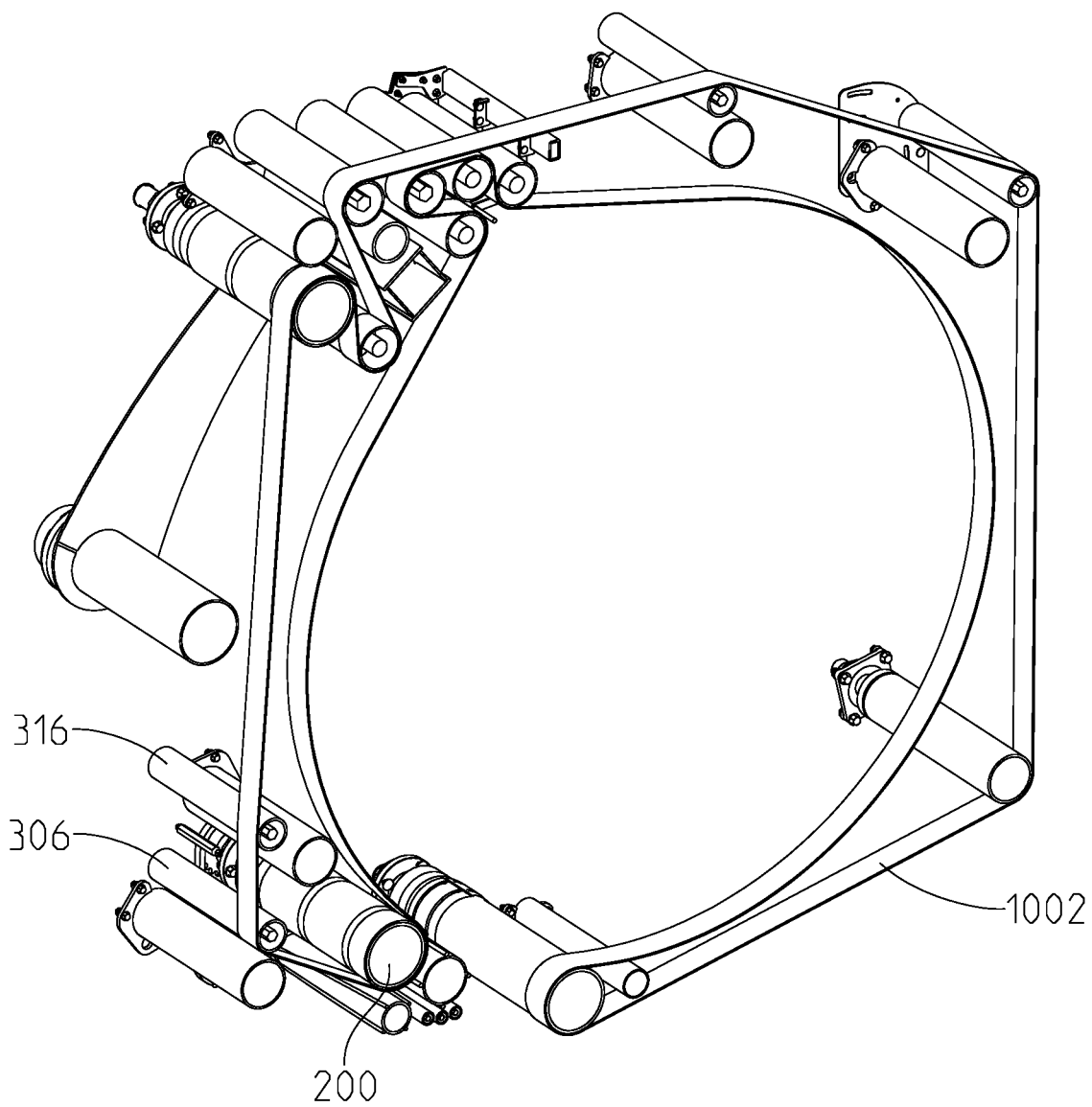
FIG. 11a is an elevated perspective view of a belt on a first belt path.
Figure 11B:
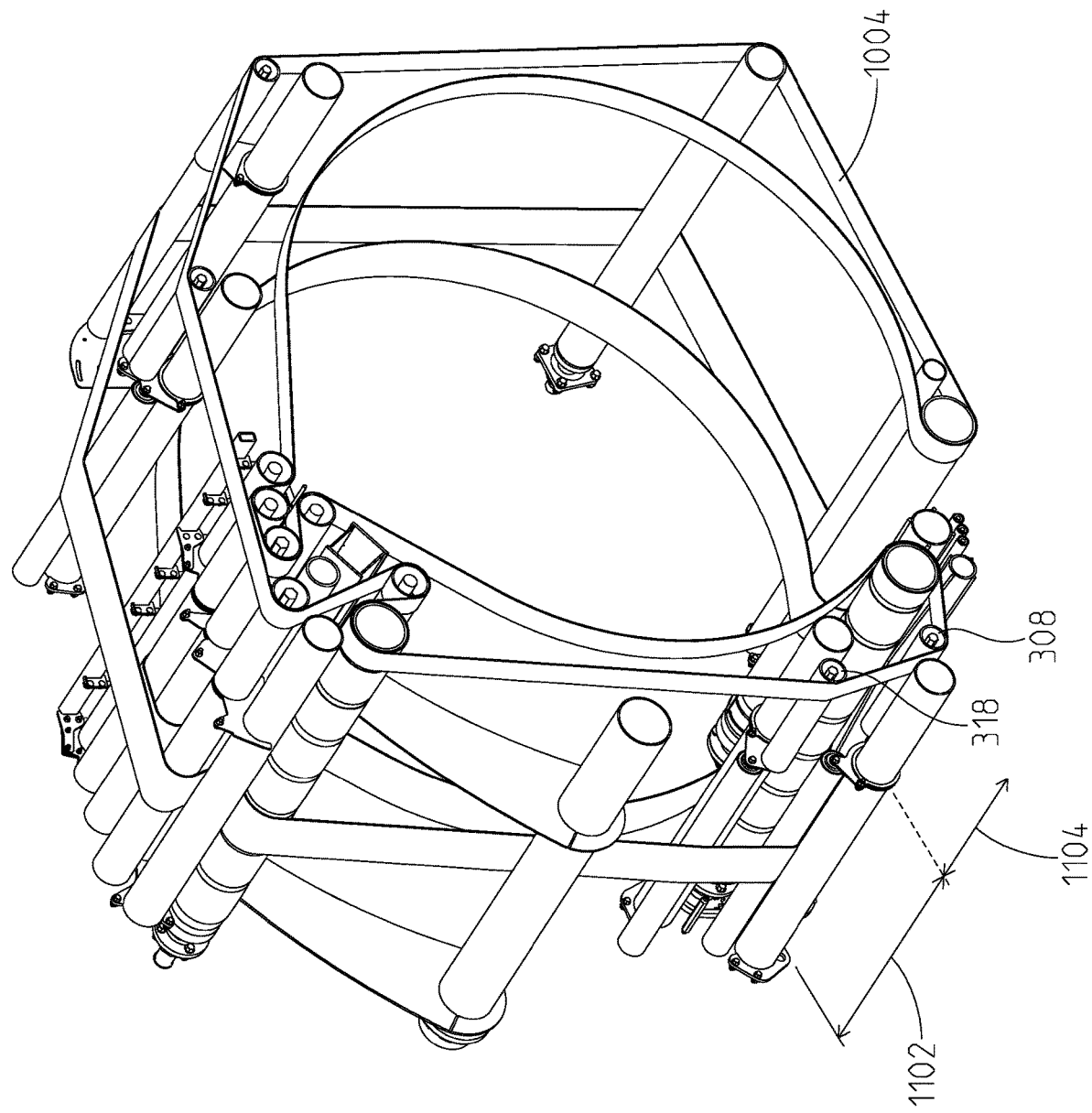
FIG. 11b is an elevated perspective view of the belt on the first belt path of FIG. 11a along with a belt on a second belt path.

Referring now to FIG. 10, a belt routing configuration 1000 is illustrated. As described above, the roller assembly 300 can have a plurality of rollers coupled to roller support members 310. The roller support members 310 in turn allow the rollers of the first side 1102 of the module builder to be offset from the rollers of the second side 1104 of the module builder. By separating the rollers into the two different sides 1102, 1104, the corresponding belts can be routed along different paths between the first side and the second side. More specifically, the profile view of FIG. 10 illustrates how a first belt path 1002 (see also FIG. 11a) may be different from a second belt path 1004 (see also FIG. 11b). In one non-limiting example, the upper front gate roller assembly 334 may position the first roller 336 in the first side 1102 and slightly offset towards the upper rear frame roll 225 relative to the second roller 338 in the second side 1104. Similarly, the upper rear gate roller assembly 340 may position the first roller 342 in the first side 1102 and spaced slightly away from the upper front gate roller assembly 334 relative to the second roller 344 positioned in the second side 1104. The first separation roller assembly 304 and the second separation roller assembly 314 may similarly offset the respective first and second rollers 306, 308, 316, 318 in the respective sides 1102, 1104 of the roller assembly 300.

In one aspect of the embodiment of FIG. 10, at least some of the belts that travel along the corresponding belt paths 1002, 1004 are substantially the same length. That is to say, the rollers are correspondingly offset to ensure that the belt paths 1002, 1004 are ultimately the same length regardless of where they may be offset. In other words, if the first belt path 1002 is offset away from a module axis 1006 at one roller assembly, it may be offset towards the module axis 1006 at a different roller assembly, thereby ensuring that the overall length of the first belt path 1002 is the same as the overall length of the second belt path 1004.

In one aspect of the present disclosure, the first and second sides 1102, 1104 of the roller assembly may each provide for multiple belt paths within their respective sides 1102, 1104. More specifically, in one nonexclusive example, the first belt path 1002 may not be the only belt path on the first side 1102. In this example, a first alternative belt path (not particularly shown) may bypass the first roller 306 for the first separation roller assembly 304 and pass straight to the first roller 316 of the second separation roller assembly 314. Accordingly, in this example the first side 1102 may define both the first belt path 1002 and the first alternative belt path. Further still, belts configured to be positioned along the first belt path 1002 may have a first belt path length while belts configured to be positioned along the first alternative belt path may have a first alternative belt path length, the two lengths being different from one another.

Similarly, the second belt path 1004 may not be the only belt path on the second side 1104. In this example, a second alternative belt path (not particularly shown) may bypass the second roller 308 for the first separation roller assembly 304 and pass straight to the second roller 318 of the second separation roller assembly 314. Accordingly, in this example the second side 1104 may define both the second belt path 1004 and the second alternative belt path. Further still, belts configured to be positioned along the second belt path 1004 may have a second belt path length while belts configured to be positioned along the second alternative belt path may have a second alternative belt path length, the two lengths being different from one another.

In one aspect of the above example, the first belt path length is the same as the second belt path length and the first alternative belt path length is the same as the second alternative belt path length. However, this disclosure is not limited to such a configuration. Also considered herein is an embodiment where the first belt path length is different from the second belt path length but the first and second alternative belt lengths are the same. Alternatively, the first and second belt path lengths may be the same, but the first and second alternative belt lengths may be different. In yet another embodiment, none of the first and second belt path lengths or the first and second alternative belt path lengths are the same. Further still, in another embodiment all belt lengths are the same. Accordingly, this disclosure considers many different variations of roller and belt configurations and is not limited to the roller and belt configurations specifically shown and described herein.

This disclosure also considers embodiments that utilize more than two rollers to span the module width 302. More specifically, while rollers are shown separated between the first side 1102 and the second side 1104 of the module assembly 300, other embodiment may separate the module assembly into thirds utilizing the teachings of this disclosure. In this embodiment, there may be two roller support brackets 312 on each roller support cross-member 310 to allow 3 rollers to be utilized to span the module width 302. Similarly, the rockshaft assembly 350 may have a first, second, third, and fourth arm each having a roller positioned there between to span the module width 302. Further still, the teachings of this disclosure can be applied to any number of rollers used to span a module width and this disclosure is not limited to only utilizing two rollers as shown and described throughout as one non-limiting example.

Figure 12:
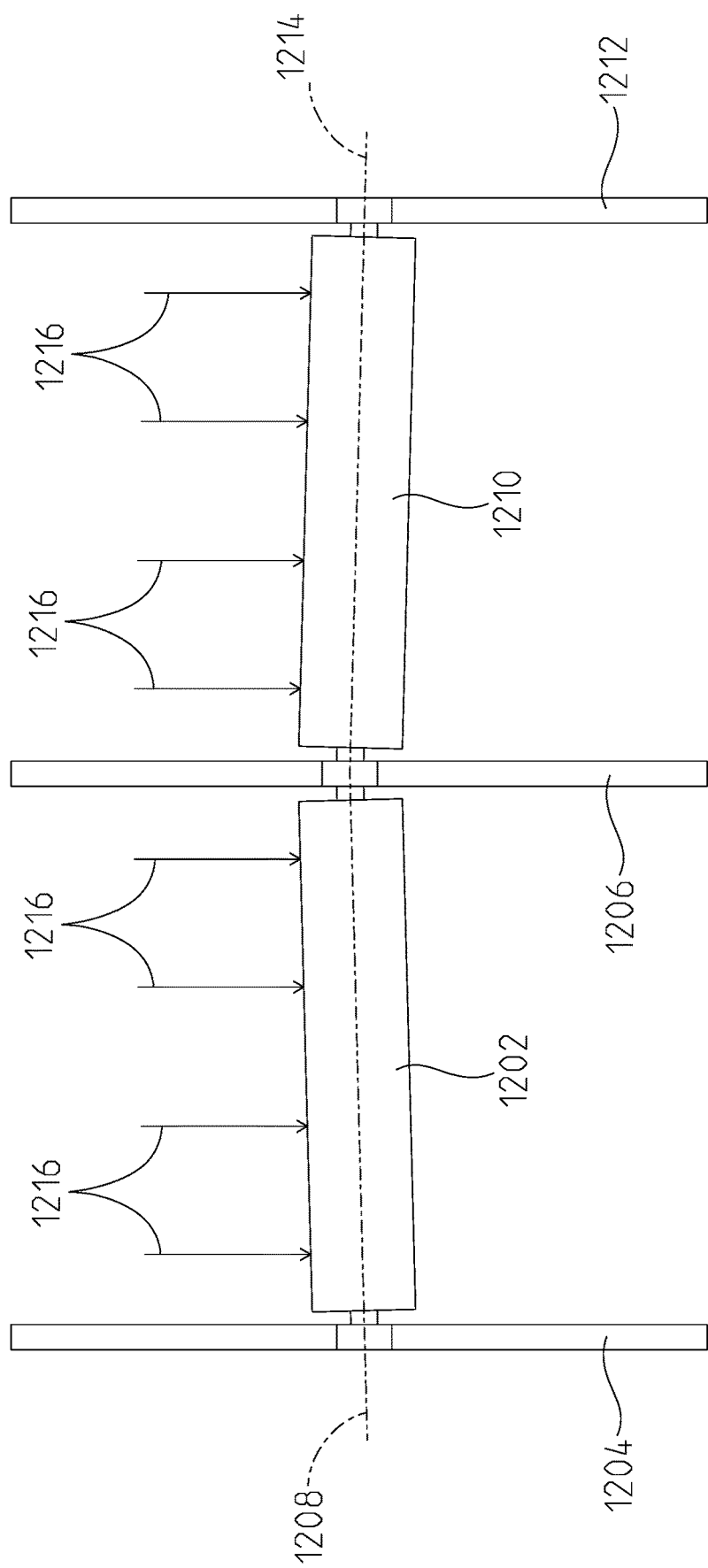
FIG. 12 is one embodiment of a roller alignment configuration.

FIG. 12 illustrates yet another embodiment of the present disclosure. More specifically, in FIG. 12 a first roller 1202 may be rotationally coupled between a first member 1204 and a second member 1206 along a first roller axis 1208 using similar coupling methods as those described herein. Further, a second roller 1210 may be rotationally coupled between the second member 1206 and a third member 1212 along a second roller axis 1214 using similar coupling methods as those described herein. In this embodiment, however, the first roller axis 1208 and the second roller axis 1214 may intersect at the second member 1206 but be offset from one another otherwise. The rollers 1202, 1210 may be positioned at a location that will be experiencing a belt force 1216 along the rollers 1202, 12010. The offset orientation of the roller axis 1208, 1212 may allow slight deformation along the second member 1206 when the belt force 1216 is applied to the rollers 1202, 1210. Accordingly, the rollers 1202, 1210 may be forced, via the belt force 1216, into a more coaxial orientation with one another.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A rockshaft assembly for a round module building machine, comprising:
   a first arm, a second arm, and a third arm all pivotally coupled to the module building machine;
   a first rockshaft roller rotationally coupled between the first arm and the second arm along a roller axis; and
   a second rockshaft roller rotationally coupled between the second arm and the third arm along the roller axis;
   wherein, the first arm is spaced from the third arm a module width that is the width of a module formed in the round module building machine such that the combination of the first rockshaft roller and the second rockshaft roller span the module width.

2. The rockshaft assembly of claim 1, wherein the first rockshaft roller partially defines a first belt path and the second rockshaft roller partially defines a second belt path.

3. The rockshaft assembly of claim 1, further comprising a support structure coupled to the first arm and the second arm and further coupled to the second arm and the third arm.

4. The rockshaft assembly of claim 3, wherein the support structure is fixedly coupled to the second arm and removably coupled to the first arm and the third arm.

5. The rockshaft assembly of claim 1, further comprising:
   a first through hole defined through the first arm along the roller axis;
   a second through hole defined through the second arm along the roller axis; and
   a third through hole defined through the third arm along the roller axis;
   wherein, each of the first, second, and third through holes have a different size relative to one another.

6. The rockshaft assembly of claim 1, further comprising a shaft positioned along the roller axis and extending from the first arm to the third arm, the first rockshaft roller and second rockshaft roller being rotationally coupled to the shaft.

7. The rockshaft assembly of claim 6, further comprising a slot defined in the second arm at least partially along the roller axis, wherein the shaft is configured to slide through the slot into alignment with the roller axis with both the first rockshaft roller and the second rockshaft roller pre-installed on the shaft.

8. The rockshaft assembly of claim 7, further comprising a slot clamp that is removably coupled to the second arm proximate to the slot, wherein the slot clamp retains the shaft within the slot when coupled to the second arm.

9. The rockshaft assembly of claim 5, further comprising:
a first spacer positioned at least partially within the first through hole and defining a coupler through hole;
wherein, a coupler is positioned through the coupler through hole of the spacer to couple a shaft to the first arm.

10. The rockshaft assembly of claim 1, wherein the round module building machine is configured to produce a round module of cotton.

11. A round module building machine, comprising:
a frame having a first wall and a second wall separated from one another;
a plurality of rollers positioned between the first wall and the second wall, the plurality of rollers defining at least one belt path; and
a rockshaft arm assembly comprising a frame pivot pivotally coupled between the first wall and the second wall, the rockshaft arm assembly comprising:
a first arm, a second arm, and a third arm;
a first rockshaft roller rotationally coupled between the first arm and the second arm along a roller axis; and
a second rockshaft roller rotationally coupled between the second arm and the third arm along the roller axis;
wherein, the first arm is spaced from the third arm a module width that is the width of a round module;
wherein the combination of the first rockshaft roller and the second rockshaft roller span the module width.

12. The round module building machine of claim 11, wherein the at least one belt path comprises:
a first belt path defined at least partially on the first rockshaft roller; and
a second belt path defined at least partially on the second rockshaft roller.

13. The round module building assembly of claim 12, further wherein the plurality of rollers comprises:
a first set of rollers at least partially defining the first belt path and positioned on a first side of the module building assembly; and
a second set of rollers at least partially defining the second belt path and positioned on a second side of the module building assembly;
wherein the first belt path is different than the second belt path.

14. The round module building assembly of claim 11, further comprising:
a roller support cross-member coupled to the first wall on a first end and to the second wall on a second end; and
a roller support bracket coupled to the roller support cross-member between the first end and the second end;
wherein, a first roller of the plurality of rollers is rotationally coupled to the roller support bracket on a first roller end and to the first wall on a second roller end.

15. The round module building assembly of claim 11, further comprising a belt alignment assembly, comprising:
a roller support cross-member coupled to the first wall and the second wall and having a first adjustable side member proximate to the first wall and a second adjustable side member proximate to the second wall;
a roller support bracket coupled to the roller support cross-member between a first end and a second end;
a first adjustable roller of the plurality of rollers positioned between the first adjustable side member and the roller support bracket; and
a second adjustable roller of the plurality of rollers positioned between the second adjustable side member and the roller support bracket;
wherein, the first adjustable roller is repositionable to change an alignment of the first adjustable roller relative to the roller support cross-member;
wherein the second adjustable roller is repositionable to change an alignment of the second adjustable roller relative to the roller support cross-member.

16. The round module building assembly of claim 15, wherein the at least one belt path further comprises a first belt path and a second belt path;
wherein the first adjustable roller adjusts an alignment of the first belt path relative to the first and second walls and the second adjustable roller adjusts an alignment of the second belt path relative to the first and second walls.

17. A round module building system, comprising:
a first member;
a second member spaced from the first member;
a third member spaced from the second member away from the first member;
a first roller assembly having a first roller rotationally coupled between the first member and the second member and a second roller rotationally coupled between the second member and the third member, the first roller and second roller configured to separately rotate from one another; and
at least one shaft positioned between the first member and the third member;
wherein, the at least one shaft rotationally couples the first roller to the first member and the second member and the second roller to the second member, and the third member;
wherein, the first member is spaced from the third member a module width that is the width of a round module formed in the round module building system such that the combination of the first roller and the second roller span the module width;
wherein at least one of the first member, the second member, or the third member are pivotable about a frame pivot that is pivotally coupled between a first wall and a second wall.

18. The round module building system of claim 17, further comprising a first shaft coupler and a second shaft coupler, the first shaft coupler and the second shaft coupler each having a head and a threaded through hole;
wherein the first shaft coupler is positioned through the first member, and the threaded through hole is threadably coupled to the shaft so the head couples the shaft to the first member;
wherein, the second shaft coupler is positioned through the second member, and the threaded through hole is threadably coupled to the shaft so the head couples the shaft to the second member.

19. A round module building system, comprising:
a first member;
a second member spaced from the first member;
a third member spaced from the second member away from the first member;
a first movable roller assembly having a first roller rotationally coupled between the first member and the second member and a second roller rotationally coupled between the second member and the third member; and
at least one shaft positioned between the first member and the third member;
wherein, the at least one shaft rotationally couples the first roller to the first member and the second member and the second roller to the second member, and the third member;
wherein, the first member is spaced from the third member a module width that is the width of a round module formed in the round module building system such that the combination of the first roller and the second roller span the module width;
wherein the first member, the second member, and the third member are pivotable about a frame pivot that is pivotally coupled between a first wall and a second wall.

20. The round module building system of claim 19, further comprising a second movable roller assembly positioned between the first member, the second member, and the third member.

\* \* \* \* \*